(12) United States Patent
Kashiwagi et al.

(10) Patent No.: US 7,207,891 B2
(45) Date of Patent: Apr. 24, 2007

(54) BOOT STRUCTURE FITTING FOR MECHANICAL JOINT

(75) Inventors: Isashi Kashiwagi, Kariya (JP); Masahiro Yoshida, Nishikasugai-gun (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 181 days.

(21) Appl. No.: 10/886,543

(22) Filed: Jul. 9, 2004

(65) Prior Publication Data
US 2005/0026706 A1 Feb. 3, 2005

(30) Foreign Application Priority Data
Aug. 1, 2003 (JP) ............................. 2003-284775

(51) Int. Cl.
*F16D 3/84* (2006.01)
(52) U.S. Cl. ...................... 464/175; 277/636; 277/637
(58) Field of Classification Search ........ 277/634–636, 277/637, 640, 641, 644, 649; 464/173, 175; 403/50
See application file for complete search history.

(56) References Cited

U.S. PATENT DOCUMENTS 5,345,857 A * 9/1994 Murphy .................. 277/636 X
5,672,113 A 9/1997 Tomogami et al.
5,725,433 A 3/1998 Kudo et al.

FOREIGN PATENT DOCUMENTS

DE 37 27 871 A1 * 3/1989 ................. 464/175

* cited by examiner

*Primary Examiner*—Greg Binda
(74) *Attorney, Agent, or Firm*—Oblon, Spivak, McClelland, Maier & Neustadt, P.C.

(57) ABSTRACT

A boot fitting structure is fitted onto an axial component to protect it from a dirty environment including outside dust. The boot has a pair of annular grooves and an annular lip between the pair of annular grooves on an inner surface of the boot. The annular lip does not project from an inner surface toward a centerline of the boot. An annular protuberance is provided between the boot and a clamp, through which clamping force from the clamp is concentrated on the annular lip, so that the annular lip is elastically deformed and pushed toward outside of the axial component. Therefore, the axial component can be inserted into the boot without interference between the annular lip and the axial component. Furthermore, the annular lip is free from damage by interference between the annular lip and the axial component.

9 Claims, 5 Drawing Sheets (A)

(B)

(A)

(B)

(A)

(B)

BOOT STRUCTURE FITTING FOR MECHANICAL JOINT

INCORPORATION BY REFERENCE

The present application claims priority under 35 U.S.C. §119 to Japanese Patent Application No. 2003-284775, filed on Aug. 1, 2003. The contents of that application are incorporated herein by reference in their entirety.

BACKGROUND OF THE INVENTION

1. Field of the Invention

The present invention relates to a boot fitting structure between an axial component for a mechanical joint and a boot for protecting the joint from a dirty environment.

2. Description of the Related Art

In a prior art fitting structure between a boot and an axial component, the boot has an annular lip on an inner surface of a fitting portion. The annular lip extends to an inside of the inner surface of the fitting portion. Then the boot is tightly fitted into the axial component and clamped by a clamp from outside of the boot.

However, it is difficult to assemble the boot by inserting the axial component into the boot due to the annular lip projected from the inner surface of the fitting portion toward center axis of the boot, because the annular lip interferes with the axial component. Also, the annular lip may be damaged by an edge of the axial component. Due to these issues, the top end of the annular lip must have a large radius. In order to increase the sealing performance, it would be better to use an annular lip with a small radius top end. However, the small radius top end of the annular lip is easily damaged by the edge of the axial component when the axial component is inserted into the boot.

SUMMARY OF THE INVENTION

It is an object of the present invention to provide a boot fitting structure for a mechanical joint without difficulty during inserting the axial component in the boot. In order to eliminate difficulty during inserting the axial component in the boot, an annular lip on the inner surface of the boot is formed so that it does not project toward the inner surface of the boot fitting.

It is a second object of the present invention to provide the boot fitting structure for the axial component to achieve tight fitting to the axial component by elastically deforming of the annular lip.

It is a third object of the present invention to effectively achieve a concentration of a clamping force to the annular lip by use of a protuberance.

It is a fourth object of the present invention to provide stable sealing performance between the boot and the axial component by an annular lip with a small radius top.

It is a fifth object of the present invention to prevent the boot from coming off from the axial component. An outer groove is formed on an outer surface of the axial component and the elastically deformed annular lip of the boot can enter the outer groove on the outer surface of the axial component after clamping by the clamp.

It is a sixth object of the present invention to provide a constant velocity joint with applications of the boot fitting structure for the mechanical joint mentioned above.

It is a seventh object of the present invention to provide a power steering apparatus with applications of the boot fitting structure for the mechanical joint mentioned above.

The boot fitting structure for the axial component according to the present invention mainly comprises a pair of annular grooves, an annular lip, a clamp clamping from outside of the boot and an annular protuberance between the boot and the clamp. The annular lip is formed between said pair of annular grooves on the inner surface of the fitting portion so that the top end of the annular lip is not projected from the inner surface of the boot fitting toward the centerline of the boot. Clamping force from the clamp is concentrated through the annular protuberance to the annular lip, whereby the annular lip is elastically deformed and is pushed toward the outer surface of the axial component. By these constructions, the axial component can be inserted easily into the boot, because there is no interference between the annular lip and the axial component.

The second aspect of the present invention is that an annular protuberance is formed on an outer surface of the boot or inner surface of the clamp to concentrate the clamping force from the clamp at the annular lip.

The third aspect of the present invention is that the annular lip has a small radius top end for stable sealing between the boot and the axial component.

The fourth aspect of the present invention is that the axial component has an outer groove on the outer surface thereof. When the boot is clamped by the clamp to the axial component, the annular lip is elastically deformed and can enter the outer groove of the axial component to prevent the boot from coming off from the axial component.

BRIEF DESCRIPTION OF THE DRAWING FIGURES

FIG. 2 (B) illustrates an assembly of the boot structure of the first embodiment of the present invention with a clamp.

FIG. 5 (B) illustrates an assembly of the boot illustrated in FIG. 5 (A), an axial component and a clamp.

DESCRIPTION OF THE PREFERRED EMBODIMENTS

Figure 1:
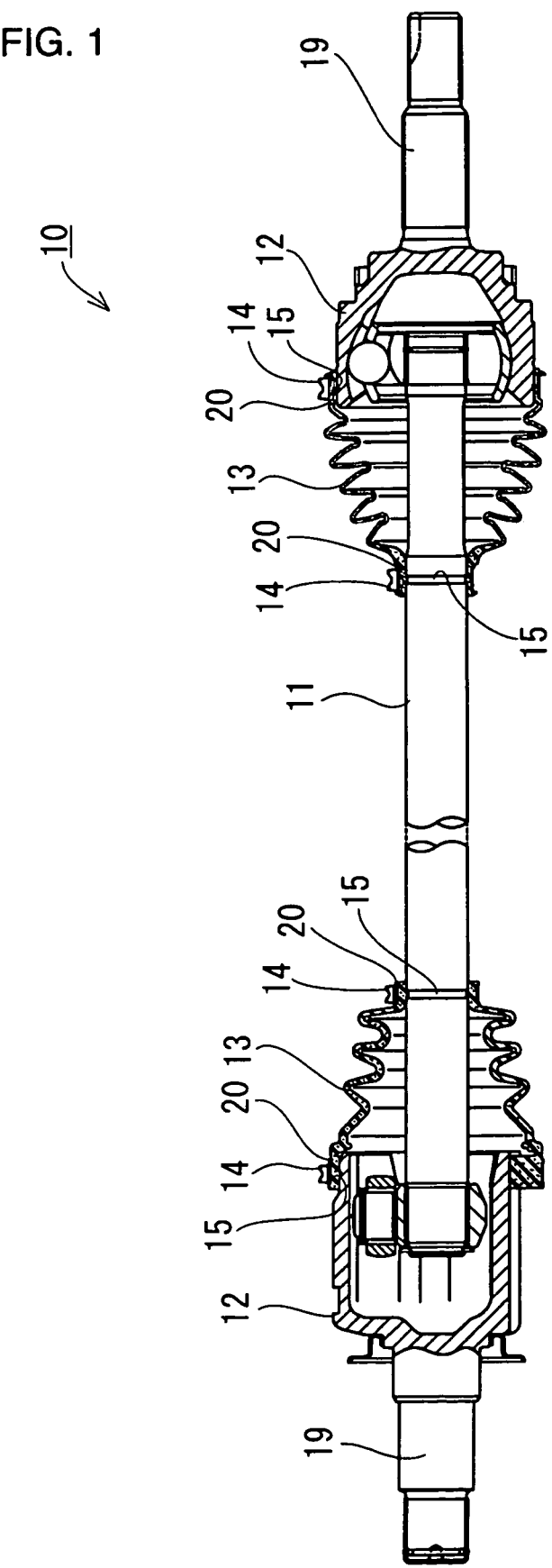
FIG. 1 illustrates an assembly of a constant velocity joint for an automobile in a partially sectional view.

FIG. 1 illustrates a constant velocity joint 10 that transmits output torque from an engine to driven right and left wheels (not shown). The constant velocity joint is respectively located along the right and left direction of a vehicle. A tie rod 19 is respectively connected to each end of driving shafts 11 of the constant velocity joints. Each tie rod 19 has an outer body in a cylindrical shape, and the driving shaft 11 is inserted into an inlet of the outer housing 12. In order to protect from outside dust, a boot 13 is fitted to the opening of the outer housing 12. The driving shafts 11 and the outer housing 12 comprise an axial component of the constant velocity joint.

The boot 13 is made of flexible materials like rubber or synthetic resin and is formed by a molding technique. Both ends of the boot 13 have a cylindrical opening and a bellows portion between the ends of the boot 13.

One end of the boot 13 is tightly fitted with the outer housing 12 of the tie rod and the other end of the boot 13 is tightly fitted with the driving shaft 11. Both ends of boot 13 are clamped by a clamp 14 from outside of the boot 13 respectively.

Figure 2:
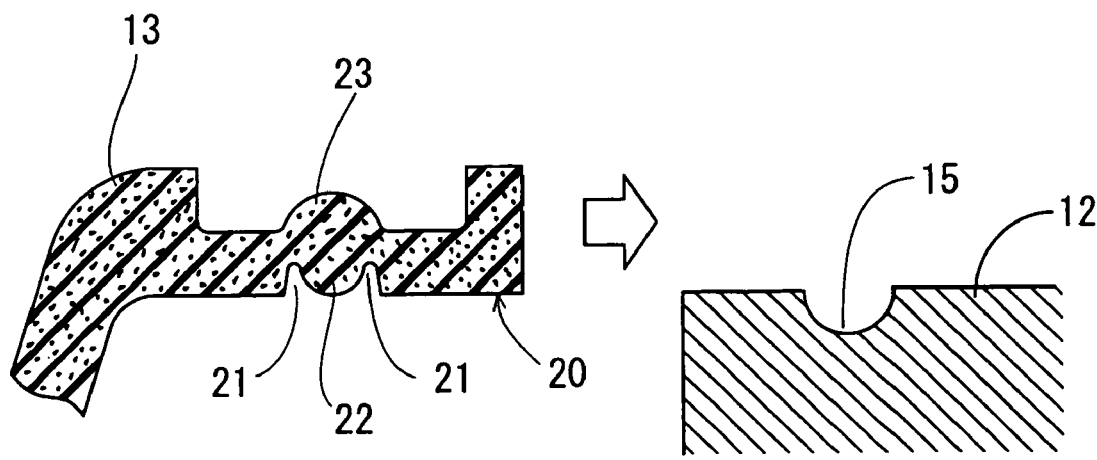
FIG. 2 (A) is a sectional view of a boot fitting structure for the constant velocity joint of the first embodiment of the present invention with outer annular groove on the axial component.
Figure 2:
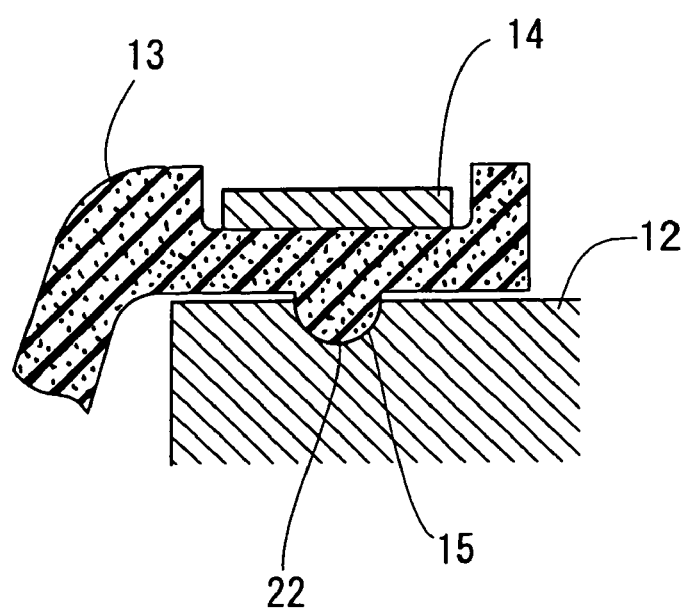

FIG. 2 (A) and FIG. 2 (B) illustrate first embodiment of the present invention. FIG. 2 (A) shows a detail construction of the boot 13 and a fitting portion of the outer housing 12. There are a pair of annular grooves 21, 21 and an annular lip 22 between the annular grooves 21, 21 on an inner surface 20 of the fitting portion of the boot 13. The annular lip 22 is formed so that the top end of the lip is not projected from the inner surface 20 toward the centerline of the boot. Also, the annular lip 22 is formed to have a small radius top end. An annular protuberance 23 is formed on an opposite side of the annular lip 22 on the outer surface of the boot 13. Therefore, the outer housing 12 can be inserted into the boot 13 without interference between the annular lip 22 and the edge of the outer housing 12. The outer housing 12 has a circumferential groove 15 on outer surface thereof, and the circumferential groove 15 is located at a corresponding longitudinal position to the annular lip 22 of the boot 13 after the boot 13 is assembled to the outer housing 12.

FIG. 2 (B) illustrates clamping of the boot 13 and the outer housing 12 by clamp 14 in first embodiment. After the boot 13 is fitted into the outer housing 12, the boot 13 is clamped by the clamp 14. At this time, the annular lip 22 is elastically deformed through the annular protuberance 23 and can enter the outer annular groove 15 of the outer housing 12 by which a clamping force from the clamp is concentrated at the annular lip 22. The elastically deformed annular lip 22 prevents the boot 13 from coming off from the outer housing 12 and provides sealing between the boot 13 and the outer housing 12.

Figure 3:
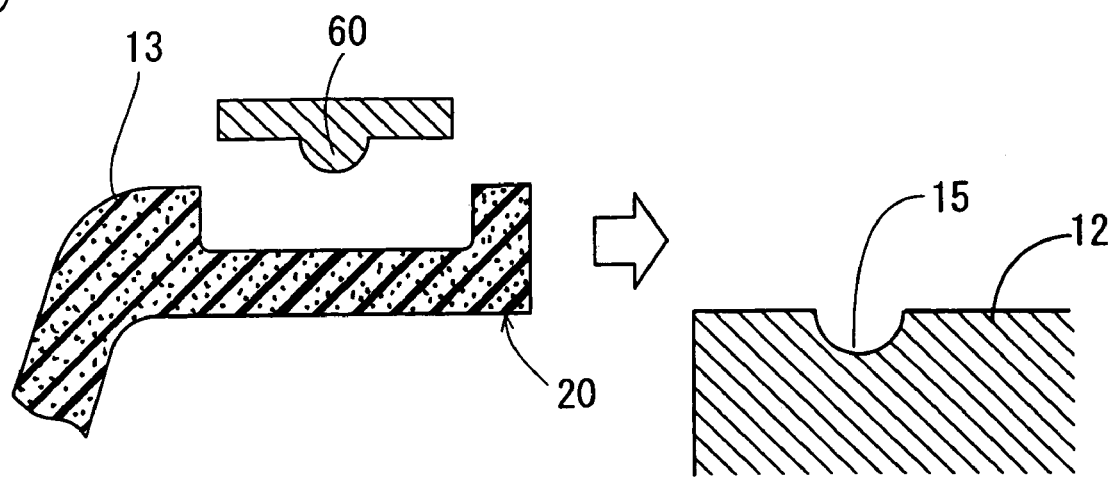
FIG. 3 is a sectional view of the boot structure of the second embodiment of the present invention with another clamp.
Figure 3:
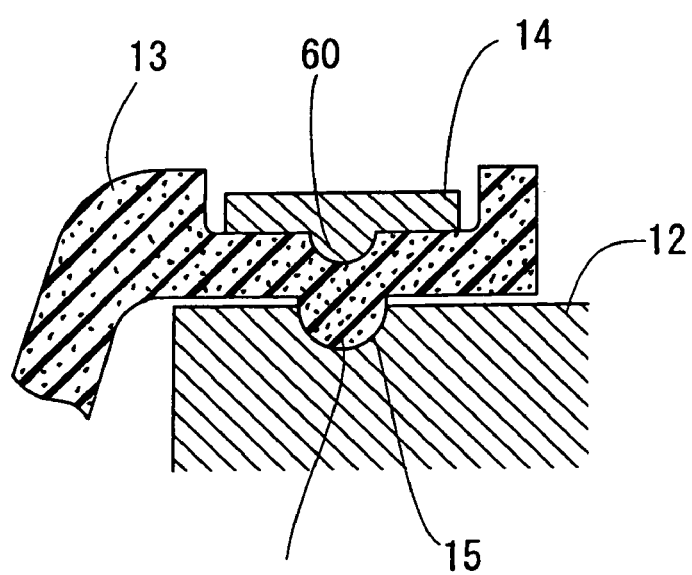

FIG. 3 illustrates clamping of the boot 13 and the outer housing 12 by clamp 14 after the boot 13 is fitted into the outer housing 12 and clamped by the clamp 14 in a second embodiment. The clamp 14 has an annular protuberance 60 on an inner surface thereof instead of the annular protuberance 23 on an outer surface of the boot 13 illustrated in FIG. 2 (A). Clamping force from the clamp 14 is concentrated through the annular protuberance 60 on the inner surface of the clamp 14 to the annular lip 22, and the annular lip 22 is elastically deformed and pushed toward the outer surface of the outer housing 12.

Figure 4:
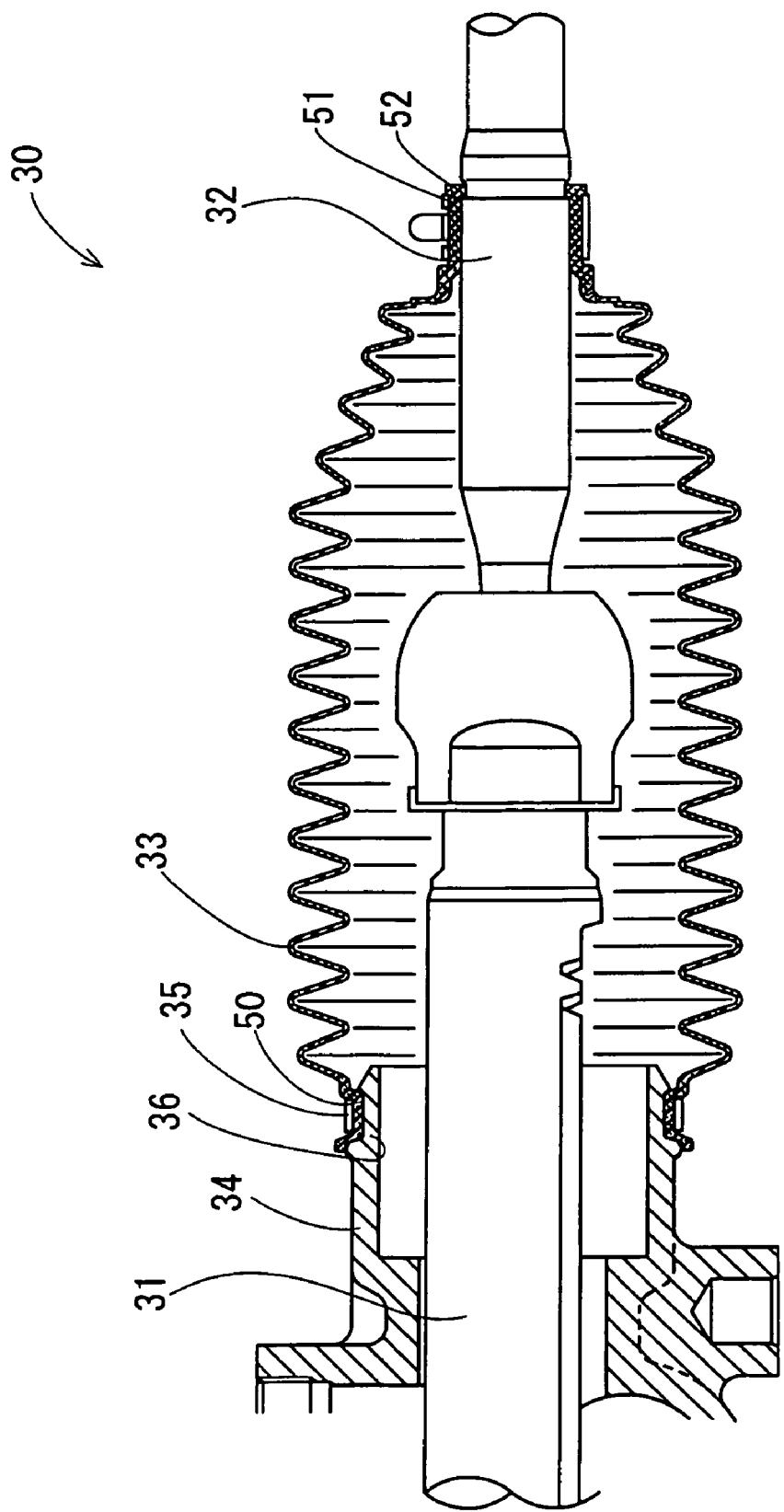
FIG. 4 illustrates an assembly of power steering apparatus for an automobile in a partially sectional view.

FIG. 4 illustrates the assembly of a power steering apparatus 30 of the rack and pinion type. The power steering apparatus 30 is located in the right and left direction of a vehicle and is tied with each of tie rods 32 on both ends of the power steering apparatus 30 respectively. In the longitudinal direction, the center portion of a rack gear 31 is covered by a rack gear case 34, and both ends of the rack gear 31 protrude from the rack gear case 34. Each end of the rack gear 31 is connected to one end of the tie rods 32 respectively, and the other end of the tie rods 32 is connected to a steered wheel (not shown). In order to protect from outside dust and seal an opening of the rack gear case 34, a boot 33 is fitted between the rack gear case 34 and the tie rod 32. The rack gear case 34 and the tie rod 32 form the axial component of the power steering apparatus. The boot 33 is made of flexible materials like rubber or synthetic resin and is formed by molding. Both ends of the boot 33 have a cylindrical opening respectively and there is a bellows portion between the ends of the boot 33. One end of the boot 33 is tightly fitted with the rack gear case 34 and the other end of the boot 33 is tightly fitted with the tie rod 32. Both ends of the boot 33 are clamped by clamps 35 from outside of the boot 33 respectively.

Figure 5:
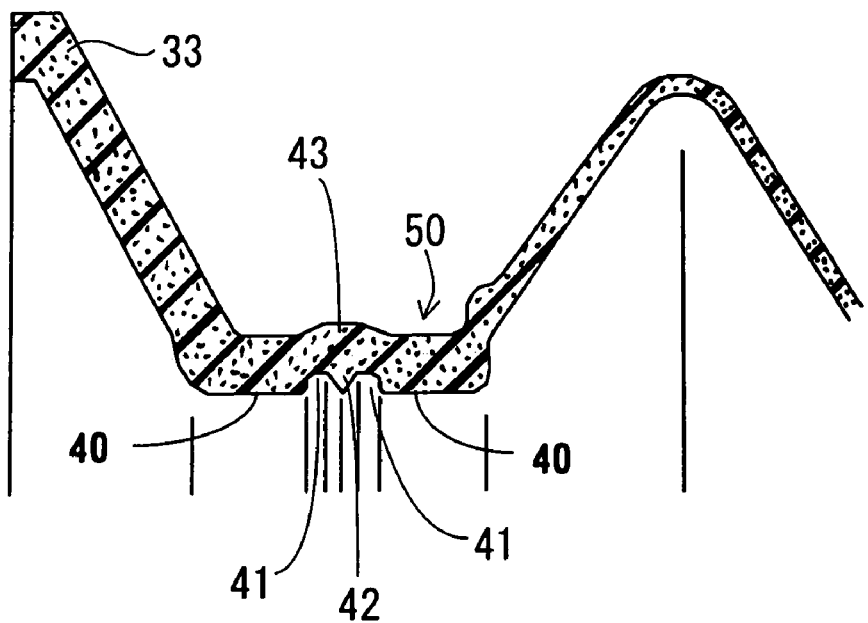
FIG. 5 (A) is a sectional view of a boot structure of the power steering apparatus of the third embodiment of the present invention.
Figure 5:
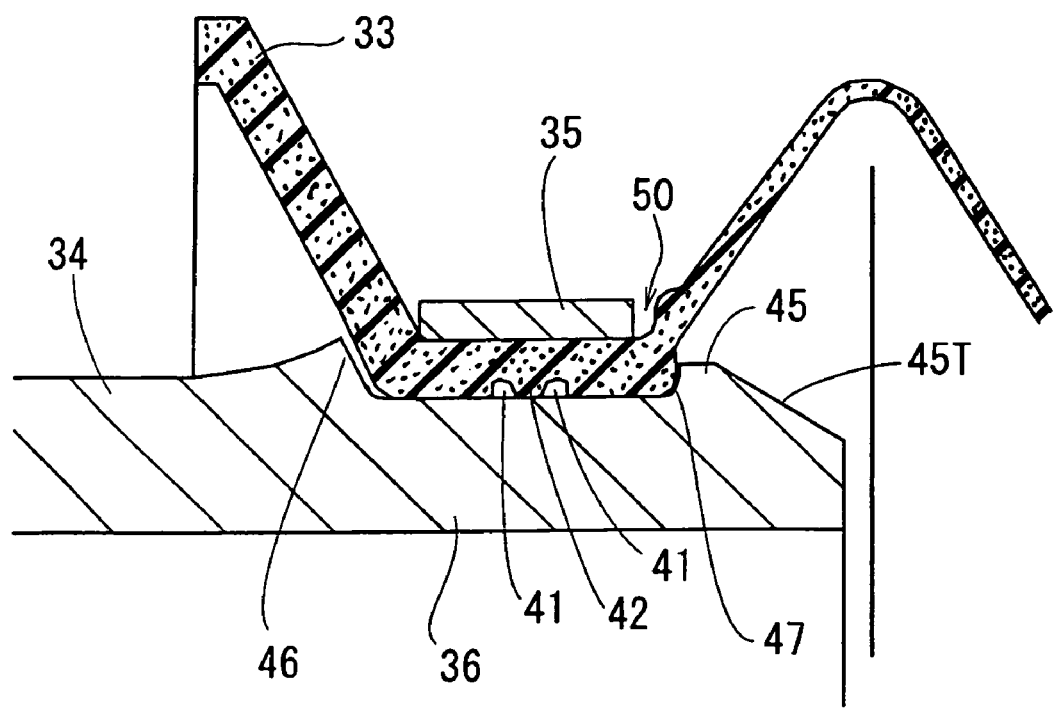

FIG. 5 (A) and FIG. 5 (B) illustrate third embodiment of the present invention applied to a power steering apparatus of the rack and pinion type.

FIG. 5 (A) illustrates details of the present invention on a boot fitting portion. There are a pair of annular grooves 41, 41 and an annular lip 42 between the annular grooves 41, 41 on an inner surface 40 of a fitting portion of the boot 33. The annular lip 42 is formed so that the top end of the lip is not projected from the inner surface 40 toward a centerline of the boot 33. Also, the annular lip 42 has a small radius top end. An annular protuberance 43 is formed on an opposite side of the annular lip on an outer surface of the boot 33. In tightly fitting the boot 33 to the rack gear case 34, the boot 33 is first pushed into the rack gear case 34. At that time, a cylindrical portion 50 of the boot 33 is enlarged by a chamfered surface 45T on the edge of rack gear case 34. Then the enlarged cylindrical portion 50 passes an annular protuberance 45 and tightly fits to an annular groove 47 on outer surface of the rack gear case 34. Since the annular lip 42 with a small radius top end is formed so that the top end of the annular lip is not projected from the inner surface 40 of the fitting portion toward a centerline of the boot 33, the rack gear case 34 can be inserted into the boot 33 without interference between the annular lip 42 and the edge of the rack gear case 34. Therefore, the top end of the annular lip 42 is free from damage due to interference with the edge of the rack gear case 34.

FIG. 5 (B) illustrates the boot 33, the rack gear case 34 and the clamp 35 after the boot 33 is fitted into the rack gear case 34 and clamped by the clamp 35. The annular lip 42 is elastically deformed and is pushed toward the outer annular groove 47 on the rack gear case 34 by which clamping force from the clamp 35 is concentrated at said annular lip 42 through the protuberance 43. Therefore, stable sealing is provided.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. A boot fitting structure for a mechanical joint comprising a boot having a cylindrical opening on both ends thereof and tightly fitted to an axial component of the mechanical joint at least one of the ends, said boot being made of flexible materials; and a clamp clamping said boot to said axial component from outside of said boot, wherein said boot fitting structure comprises:
   a pair of annular grooves formed on an inner surface of said boot;
   an annular lip formed between said pair of annular grooves and having an inner diameter which does not project from the inner surface of said boot toward a centerline of the boot; and
   an annular protuberance positioned between said boot and said clamp such that a clamping force from said clamp is concentrated at said annular lip so that said annular lip is elastically deformed and is fit tightly to an outside of said axial component.

2. The boot fitting structure according to claim 1, wherein the annular protuberance is formed on an outer surface of the boot and is located on an opposite side of the boot with respect to the annular lip, whereby the annular lip is elastically deformed and pushed toward the axial component.

3. The boot fitting structure according to claim 1, wherein the annular protuberance is on inner surface of the clamp.

4. The boot fitting structure according to claim 1, wherein said annular lip has a smaller radius than said annular protuberance.

5. The boot fitting structure according to claim 1, further comprising an annular groove on an outside of the axial component, wherein the elastically deformed annular lip can extend into the annular groove.

6. A boot fitting structure for a mechanical joint comprising a boot having cylindrical opening on both ends thereof and tightly fitted to an outer housing for a constant velocity joint and/or a driving shaft at least one of the ends, said boot being made of flexible materials; and a clamp clamping said boot to said outer housing and/or driving shaft from outside of said boot, wherein said boot fitting structure comprises:

a pair of annular grooves formed on an inner surface of said boot;

an annular lip formed between said pair of annular grooves and having an inner diameter which does not project from the inner surface of said boot toward a centerline of the boot; and an annular protuberance formed on an outer surface of said boot and positioned such that a clamping force from said clamp is concentrated at said annular lip so that said annular lip is elastically deformed and pushed toward said outer housing and/or said driving shaft.

7. A boot fitting structure for a mechanical joint according to claim 6, wherein said annular lip has smaller radius than said annular protuberance.

8. A boot fitting structure for a mechanical joint according to claim 7, wherein said annular outer groove is formed on an outer surface of an outer housing of said constant velocity joint.

9. A boot fitting structure for a mechanical joint according to claim 6, wherein said annular outer groove is formed on an outer surface of an outer housing of said constant velocity joint.

* * * * *